United States Patent
Heideman et al.

(10) Patent No.: US 9,764,352 B2
(45) Date of Patent: Sep. 19, 2017

(54) STRESS-TUNED PLANAR LIGHTWAVE CIRCUIT AND METHOD THEREFOR

(71) Applicant: Octrolix BV, Enschede (NL)

(72) Inventors: Rene Gerrit Heideman, Oldenzaal (NL); Arne Leinse, Borne (NL)

(73) Assignee: OctroliX BV, Enschede (NL)

( * ) Notice: Subject to any disclaimer, the term of this patent is extended or adjusted under 35 U.S.C. 154(b) by 0 days.

(21) Appl. No.: 14/998,174

(22) Filed: Dec. 23, 2015

(65) Prior Publication Data
US 2016/0202502 A1 Jul. 14, 2016

Related U.S. Application Data

(63) Continuation of application No. 14/580,831, filed on Dec. 23, 2014, now Pat. No. 9,221,074, which is a
(Continued)

(51) Int. Cl.
*G02F 1/035* (2006.01)
*B05D 1/36* (2006.01)
(Continued)

(52) U.S. Cl.
CPC ............. *B05D 1/36* (2013.01); *B05D 5/06* (2013.01); *G02B 6/122* (2013.01); *G02B 6/132* (2013.01);
(Continued)

(58) Field of Classification Search
CPC .......... B05D 5/06; G02B 6/122; G02B 6/132; G02B 6/14; G02B 6/305; G02F 1/00; G02F 1/01; G02F 1/225
(Continued)

(56) References Cited

U.S. PATENT DOCUMENTS 5,339,370 A * 8/1994 Sano ................. G02F 1/025
257/E27.12
5,617,499 A * 4/1997 Brueck ................. G02B 6/02
385/122

(Continued)

OTHER PUBLICATIONS

"Extended Search Report" in related EP Patent Application No. EP 13 18 3394, Apr. 14, 2014.
(Continued)

*Primary Examiner* — Ellen Kim
(74) *Attorney, Agent, or Firm* — Kaplan Breyer Schwarz, LLP

(57) ABSTRACT

A planar lightwave circuit that can be optically coupled with an external device with low optical loss, while also providing low-power functional control over an optical signal propagating through the PLC is disclosed. The PLC includes a high-contrast waveguide region in a stress-inducing (SI) phase shifter is formed such that it can control the phase of the optical signal. The high-contrast-waveguide region is optically coupled to a low-contrast-waveguide region via a spotsize converter, thereby enabling optical coupling to off-chip devices with low optical loss. Formation of the SI phase shifter in a high-contrast-waveguide region enables improved responsivity and phase control, reduced voltage, and smaller required chip real estate. As a result, the present invention enables lower-cost and higher-performance PLC systems.

17 Claims, 11 Drawing Sheets

Related U.S. Application Data continuation-in-part of application No. 14/051,715, filed on Oct. 11, 2013, now Pat. No. 9,020,317.

(60) Provisional application No. 61/712,587, filed on Oct. 11, 2012.

(51) Int. Cl.

| | |
|---|---|
| *B05D 5/06* | (2006.01) |
| *G02F 1/01* | (2006.01) |
| *G02B 6/30* | (2006.01) |
| *G02B 6/14* | (2006.01) |
| *G02F 1/00* | (2006.01) |
| *G02F 1/225* | (2006.01) |
| *G02B 6/122* | (2006.01) |
| *G02B 6/132* | (2006.01) |

(52) U.S. Cl.
CPC ............... *G02B 6/14* (2013.01); *G02B 6/305* (2013.01); *G02F 1/00* (2013.01); *G02F 1/0134* (2013.01); *G02F 1/0136* (2013.01); *G02F 1/225* (2013.01)

(58) Field of Classification Search
USPC ...... 385/14, 39, 45, 31, 3, 2, 8; 427/58, 162
See application file for complete search history.

(56) References Cited

U.S. PATENT DOCUMENTS

| | | | |
|---|---|---|---|
| 6,221,565 B1* | 4/2001 | Jain .................... | G02B 6/29322 216/24 |
| 6,293,688 B1 | 9/2001 | Deacon | |
| 6,385,354 B1* | 5/2002 | Digonnet .............. | G02F 1/0134 359/240 |
| 6,411,764 B1 | 6/2002 | Lee | |
| 6,768,855 B1 | 7/2004 | Bakke et al. | |
| 6,778,751 B2* | 8/2004 | Tada ........................ | G02F 1/025 385/131 |
| 6,847,750 B1 | 1/2005 | Baumann et al. | |
| 7,583,869 B2 | 9/2009 | Kang et al. | |
| 7,643,710 B1 | 1/2010 | Liu | |
| 7,664,352 B1 | 2/2010 | Okayama | |
| RE41,204 E* | 4/2010 | Jain .................... | G02B 6/29322 216/24 |
| 8,412,007 B2 | 4/2013 | Lee et al. | |
| 8,503,849 B2* | 8/2013 | Decorby ................ | B82Y 20/00 385/131 |
| 8,718,432 B1 | 5/2014 | Heideman et al. | |
| 2003/0068152 A1 | 4/2003 | Gunn, III | |
| 2003/0206694 A1 | 11/2003 | Babin et al. | |
| 2004/0203313 A1* | 10/2004 | Ramamoorthi ......... | H01J 7/183 445/31 |
| 2006/0285797 A1 | 12/2006 | Little | |
| 2007/0077017 A1 | 4/2007 | Menon et al. | |
| 2007/0212012 A1 | 9/2007 | Hashizume et al. | |
| 2007/0230873 A1 | 10/2007 | Little | |
| 2007/0280616 A1 | 12/2007 | Patel et al. | |
| 2009/0297092 A1 | 12/2009 | Takahashi | |
| 2010/0033063 A1* | 2/2010 | Nishihara .......... | H03H 9/02118 310/365 |
| 2010/0086255 A1 | 4/2010 | Ishizaka | |
| 2012/0224820 A1 | 9/2012 | Onishi | |

OTHER PUBLICATIONS

"European Examination Report", EP Patent Application No. 13 188 394.4 May 21, 2015.

"Notice of Allowance" issued in related U.S. Appl. No. 14/051,715 on Mar. 3, 2015.

"Final Office Action" issued in related U.S. Appl. No. 14/051,715 Nov. 24, 2014.

"Notice of Allowance", issued in related U.S. Appl. No. 14/580,831 on Nov. 5, 2015.

Donati, et al., "Piezoelectric Actuation of Silica-On-Silicon Waveguide Devices", "Photonics Technology Letters", Oct. 1998, pp. 1428-1430, vol. 10, No. 10, Publisher: IEEE.

Tsia et al., "Electrical control of parametric processes in silicon wavequides", Optics Express-doi: 10.1364/OE.16.009838 (https://www.osapublishing.org/oe/fulltext.cfm?uri=oe-16-13-9838&id=164817), Jun. 2008, pp. 9838-9843, vol. 16, No. 13, Publisher: OSA Publishing.

Tsia et al., "Electrical tuning of birefringence in silicon waveguides", (http://www.photonics.ucla.edu/media/publication/journal/10106312883925.pdf), Publisher: 2008 American Institute of Physics : DOI: 10.1063/1.2883925.

Xu et al., "High speed silicon Mach-Zehnder modulator based on interleaved PN junctions", Optics Express doi:10.1364/OE.20.015093 (https://www.osapublishing.org/oe/abstract.cfm?uri=oe-20-14-15093), Jun. 20, 2012, pp. 15093-15099, vol. 20, No. Issue 14, Publisher: 2012 OSA.

Chmielak et al., "Investigation of local strain distribution and linear electro-optic effect in strained silicon waveguides", (https://www.osapublishing.org/oe/abstract.cfm?uri=oe-21-21-25324) DOI: 10.1364/OE.21.025324-Optics Express, Oct. 16, 2013, pp. 25324-25332, vol. 21, No. 21, Publisher: 2013 OSA.

Reed et al., "Silicon optical modulators", (https://www.researchgate.net/publication/257554319_Silicon_optical_modulators) ISSN:1369 7021 materialstoday Jan. 2005, Jan. 2005, pp. 40-50, Publisher: Elsevier Ltd.

Sebbag, et al., "Bistability in silicon microring resonator based on strain induced by a piezoelectric lead zirconate titanate thin film", "Applied Physics Letters", 2012, pp. 1-4, vol. 100, No. 141107, Publisher: AIP Publishing; doi: 10.1063/1.3701587; http://dx.doi.org/10.1063/1.3701587.

Schriever et al., "Strained Silicon Photonics", doi: 10.3390/ma5050889: (http://www.mdpi.com/1996-1944/5/5/889), May 22, 2012, pp. 889-908, No. 5, Publisher: Open Access materials, ISSN 1996-1944.

Moeller, et al., "Silica-Waveguide Thermooptic Phase Shifter with Low Power Consumption and Low Lateral Heat Diffusion", "Photonics Technology Letters", Dec. 1992, pp. 1415-1418, vol. 5, No. 12, Publisher: IEEE.

Uppal, et al., "Study of 1.3-MUM Tapered Waveguide SpotSize Transformers", "Journal of Selected Topics in Quantum Electronics", Jun. 3, 1997, pp. 975-979, vol. 3, No. 3, Publisher: XP000727347, IEEE Service Center ISSN: 1077-260X, DOI: 10.1109/2944.640652, Published in: US.

"Non-Final Office Action" issued in related U.S. Appl. No. 14/051,715 Jul. 18, 2014.

* cited by examiner

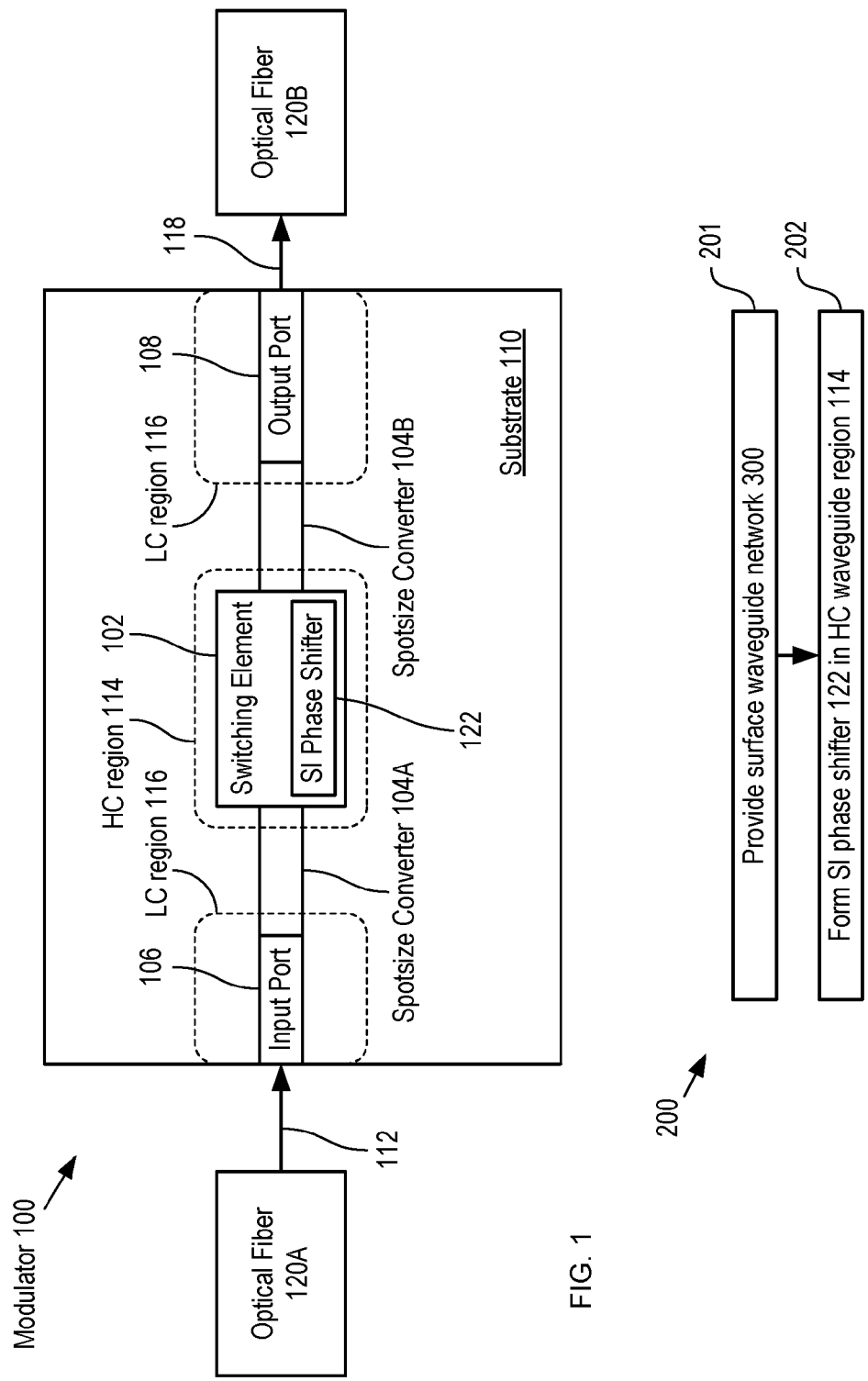

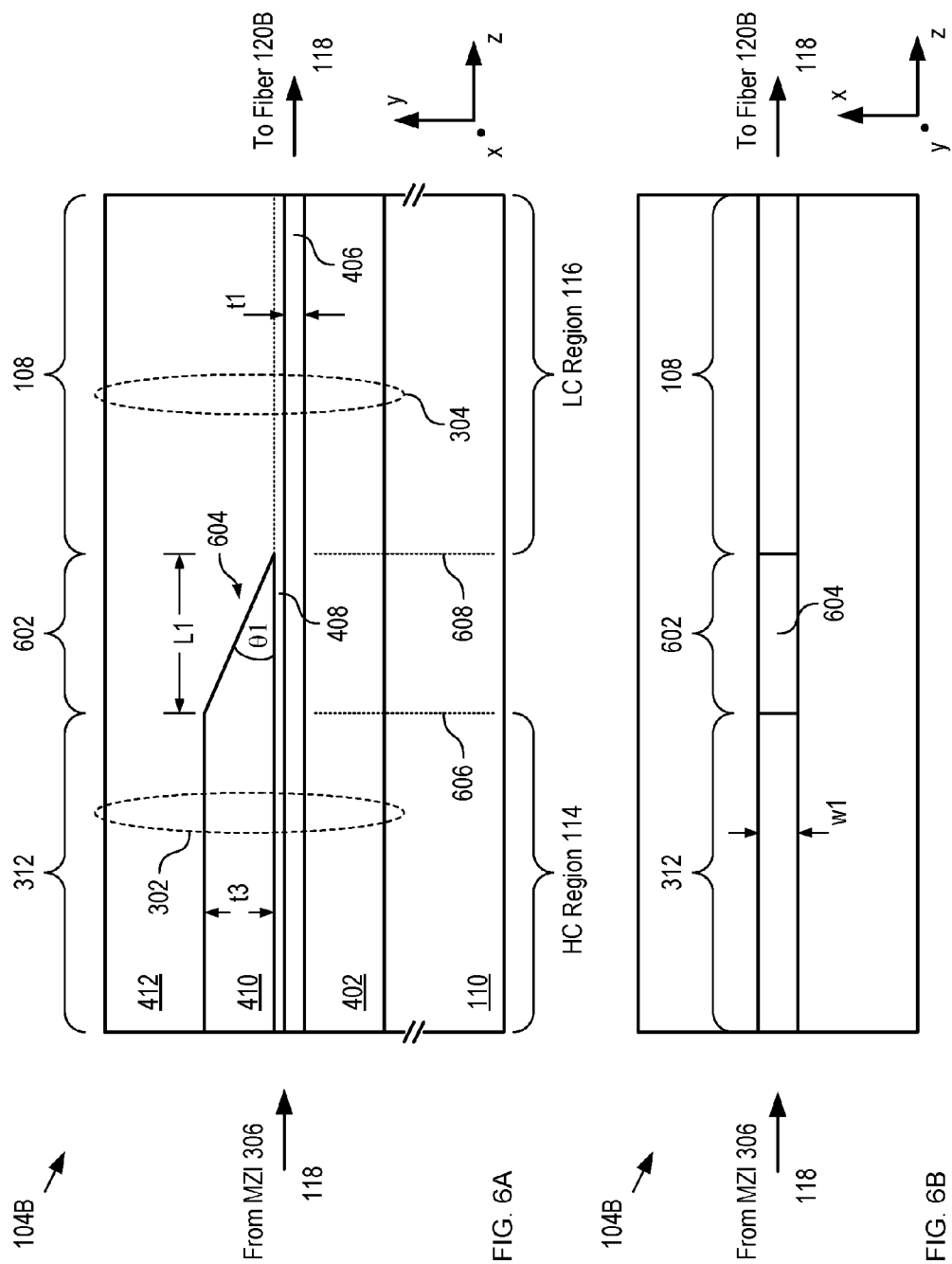

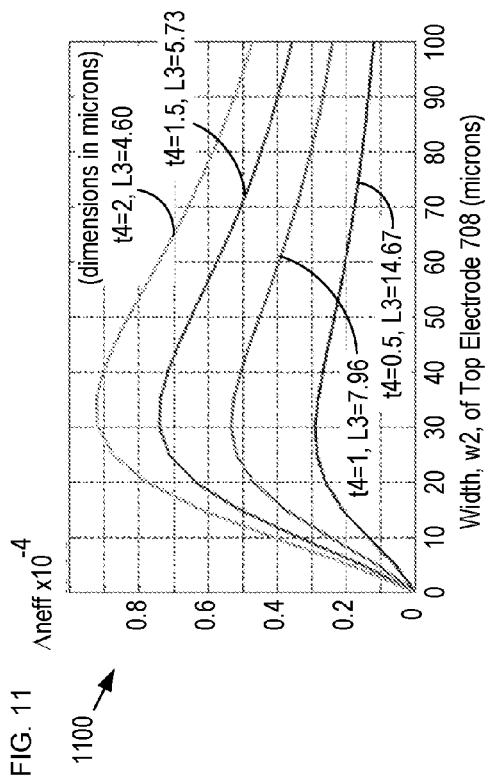
FIG. 11
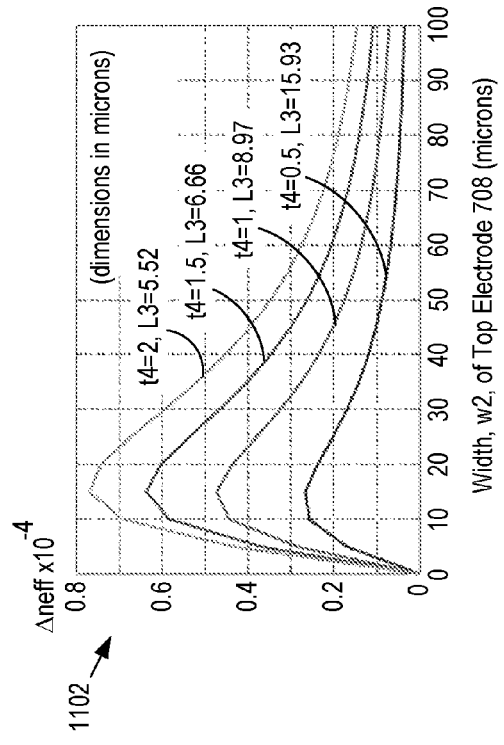

STRESS-TUNED PLANAR LIGHTWAVE CIRCUIT AND METHOD THEREFOR

CROSS REFERENCE TO RELATED APPLICATIONS

This case is continuation of co-pending U.S. patent application Ser. No. 14/580,831, filed Dec. 23, 2014, which is a continuation-in-part of U.S. patent application Ser. No. 14/051,715 (now U.S. Pat. No. 9,020,317), filed Oct. 11, 2013, which claims priority of U.S. Provisional Patent Application Ser. No. 61/712,587, filed Oct. 11, 2012, each of which is incorporated by reference.

In addition, the underlying concepts, but not necessarily the language, of the following cases are incorporated by reference:
  (1) U.S. Pat. No. 7,146,087, issued Dec. 5, 2006;
  (2) U.S. patent application Ser. No. 14/321,138; and
  (3) U.S. Pat. No. 7,142,759, issued Nov. 28, 2006.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to integrated optics in general, and, more particularly, to surface waveguide structure and technology.

BACKGROUND OF THE INVENTION

Planar Lightwave Circuits (PLCs) are optical systems comprising one or more waveguides that are integrated on the surface of a substrate, where the waveguides are typically combined to provide complex optical functionality. These "surface waveguides" typically include a core of a first material that is surrounded by a second material having a refractive index that is lower than that of the first material. The change in refractive index at the interface between the materials enables reflection of light propagating through the core, thereby guiding the light along the length of the waveguide.

PLC-based devices and systems have made significant impact in many applications, such as optical communications systems, sensor platforms, solid-state projection systems, and the like. Surface-waveguide technology satisfies a need in these systems for small-sized, reliable optical circuit components that can provide functional control over a plurality of optical signals propagating through a system. Examples include simple devices (e.g., 1×2 and 2×2 optical switches, Mach-Zehnder interferometer-based sensors, etc.), as well as more complex, matrix-based systems having multiple waveguide elements and many input and output ports (e.g., wavelength add-drop multiplexers, cross-connects, wavelength combiners, etc.).

Common to most of these systems is a need for a PLC-based switching element. Historically, the most common switching elements are based on a device known as a thermo-optic (TO) phase shifter. A TO phase shifter takes advantage of the fact that the refractive index (i.e., the speed of light in a material) of glass is temperature-dependent (referred to as the thermo-optic effect) by including a thin-film heater that is disposed on the top of the upper cladding of a surface waveguide. Electric current passed through the heater generates heat that propagates into the cladding and core materials, changing their temperature and, thus, their refractive indices. TO phase shifters have demonstrated induced phase changes as large as $2\pi$.

The TO phase shifter is typically included in another waveguide element, such as a Mach-Zehnder interferometer (MZI), to form an optical switching element. In an MZI switch arrangement, an input optical signal is split into two equal parts that propagate down a pair of substantially identical paths (i.e., arms) to a junction where they are then recombined into an output signal. One of the arms incorporates a TO phase shifter that controls the phase of the light in that arm. By imparting a phase difference of $\pi$ between the light-signal parts in the arms, the two signals destructively interfere when recombined, thereby canceling each other out to result in a zero-power output signal. When the phase difference between the light-signal parts is 0 (or $n*2\pi$, where n is an integer), the two signals recombine constructively resulting in a full-power output signal.

Unfortunately, prior-art PLC-based switching elements have disadvantages that have, thus far, limited their adoption in many applications. First, TO phase shifters consume a great deal of power—on the order of 300-500 mW per heater element. Further, in addition to heating the core and cladding materials directly below the heater element, heat from the thin-film heater also diffuses laterally in the glass, which can lead to thermal crosstalk between adjacent waveguides. Still further, glass has a low thermal conductivity coefficient, which results in heating and cooling times that are long—typically, on the order of milliseconds. As a result, TO phase shifters are poorly suited for many applications.

To overcome some of the limitations of TO phase shifters, piezoelectric-actuated, stress-inducing (SI) phase shifters were developed. SI phase shifters integrated with conventional silica-on-silicon waveguides are disclosed, for example, by S. Donati, et al., in "Piezoelectric Actuation of Silica-on-Silicon Waveguide Devices," published in *IEEE Photonics Technologies Letters*, Vol. 10, pp. 1428-1430 (1998). Such prior-art phase shifters have been shown to be able to enable optical switching on the order of a microsecond with low power dissipation.

It should be noted that a silica-on-silicon waveguide is a "low-contrast waveguide" that is characterized by only a slight difference (<1%) in the refractive indices of their core and cladding materials. Low-contrast waveguides were developed for use in telecommunications systems, where low propagation loss is critical. Low-contrast waveguides can have propagation losses less than 0.1 dB/cm. Further, the mode-field size of a low-contrast waveguide is typically well matched to that of an optical fiber, which facilitates low-loss optical coupling between them.

Unfortunately, because of this low refractive-index contrast, light is only loosely confined in the core of a low-contrast waveguide and a significant portion of its optical energy extends well out into the cladding as an evanescent tail. As a result, the mode-field profile of a light signal (i.e., the distribution of optical energy about the central axis of the waveguide) propagating in a low-contrast waveguide is quite large. In addition, low-contrast waveguides require cladding layers that are quite thick (typically, 12-25-microns thick). The need for such thick cladding layers can reduce the effectiveness of an integrated phase shifter.

In addition, the loosely confined optical energy of a light signal can leak out of the waveguide as it propagates down the waveguide—particularly at tight bends and loops. Still further, to avoid overlap of the loosely confined mode-field profiles of adjacent waveguides, low-contrast waveguides must be spaced well apart to avoid optical coupling between them.

PLCs based on low-contrast waveguides, therefore, require a great deal of chip real estate to realize any significant functionality, which results in high per chip cost. In addition, the large-bending radii requirement of low-contrast waveguides precludes realization of some waveguide components, such as large free-spectral-range ring resonators, which require small bend radii.

It would be desirable to combine SI phase shifter technology with a PLC technology requiring less chip real estate to enable low-cost, low-power, fast optical-signal control while maintaining low-loss optical coupling with external optical devices.

SUMMARY OF THE INVENTION

The present invention enables a PLC that can be optically coupled with an external device with low optical loss, while also providing low-power functional control over an optical signal propagating through the PLC, where the PLC can include high-density surface waveguides within a small chip area. As a result, embodiments of the present invention can provide high functionality operation at low cost and with low optical loss. Embodiments of the present invention are particularly well suited for use in applications such as telecommunications, data communications, projection systems, and sensors.

The present invention employs a high-contrast waveguide structure having a multi-layer core that gives rise to a tightly confined mode-field profile for light propagating through the waveguide. As a result, the cladding layers of this waveguide structure can be thinner than dielectric-based surface waveguides of the prior art. This enables more effective transfer of strain from the piezoelectric layer of an SI phase shifter disposed on the upper cladding into the waveguide, where the strain manifests as a stress-induced change in refractive index of the waveguide materials. The present invention, therefore, enables more effective phase control of a light signal, as well as PLC chips that can be significantly smaller and less expensive than optical functional PLCs of the prior art.

An illustrative embodiment of the present invention is a PLC that includes a high-contrast-waveguide region in which a Mach-Zehnder interferometer-based optical switch is formed. The output of the MZI switch is optically coupled with a low-contrast waveguide in a low-contrast-waveguide region via a spotsize converter. The low-contrast waveguide terminates at an output port having a mode-field profile that is matched to that of an external optical fiber, thereby enabling low-loss optical coupling between them.

The high-contrast waveguide includes a waveguide structure having a multi-layer core that includes first and second silicon nitride layers separated by a very thin layer of silicon dioxide. The first silicon nitride layer has a first thickness suitable for operation as a low-contrast waveguide without the presence of the second silicon nitride layer. The second silicon nitride layer has a second thickness selected such that the two silicon nitride layers collectively define a high-contrast-waveguide core that supports propagation of a light signal having a tightly confined optical mode. The silicon dioxide layer of the multi-layer core is sufficiently thin that the two silicon nitride layers are optically coupled such that they collectively support propagation of the light signal as if the silicon dioxide layer were not present. In other words, the presence of the silicon dioxide layer does not appreciably perturb the shape of the optical mode from that which would be supported by a single layer of silicon nitride having the combined thickness of the two silicon nitride layers.

The low-contrast waveguide has a core that includes the first silicon nitride layer but not the second silicon nitride layer. As a result, the low-contrast waveguide operates as a conventional silicon nitride stripe waveguide that supports a relatively larger optical mode whose mode-field profile is substantially matched to that of a conventional optical fiber. In some embodiments, the mode-field profile of the low-contrast waveguide is matched to a different external device, such as a laser, detector, etc. In some embodiments, the low-contrast waveguide terminates at an output port that includes a mode-field expander that controls the mode-field profile of the light signal to facilitate optical coupling with an external device.

The spotsize converter includes a transition region that optically couples the high-contrast waveguide and the low-contrast waveguide. The transition region has a multi-layer core that includes the first and second silicon nitride layers and the intervening silicon dioxide layer. One end of the transition region abuts the high-contrast region at a first point, while the other end of the transition region abuts the low-contrast waveguide at a second point. The thickness of the second nitride layer changes from the second thickness at the first point to extinction at the second point. As a result, the transition region adiabatically transitions the mode-field profile between the relatively smaller mode field in the high-contrast region and the relatively larger mode field in the low-contrast region.

Functional control over the optical signal in the high-contrast-waveguide region is provided via an SI phase shifter formed in one arm of the MZI switch. The SI phase shifter includes bottom and top electrical contact layers and a piezoelectric layer between them. The bottom contact is in physical contact with the thin upper cladding of the high-contrast waveguide such that an electrical signal applied between the two electrical contact layers induces a strain in the piezoelectric layer that is efficiently transferred as stress in the multi-layer core and/or upper cladding layer of the high-contrast waveguide. Further, in the illustrative embodiment, the upper cladding layer in the region of the SI phase shifter is thinned to further enhance the transfer of mechanical energy between the piezoelectric layer and the waveguide materials.

Like SI phase shifters of the prior art, the present invention induces a phase shift on a light signal propagating through a waveguide by imparting a stress on the materials of the waveguide. In contrast to prior-art SI phase shifters, however, in embodiments of the present invention, the SI phase shifter of the present invention is operatively coupled with a high-contrast waveguide. This affords embodiments of the present invention several advantages over the prior art, including:
  i. improved mechanical coupling of stress induced by the SI phase shifter with the waveguide due to thinner core and cladding layers; or
  ii. reduced real-estate requirements for the PLC by virtue of the tighter optical mode confinement, tighter bending radii, and improved waveguide density capability of high-contrast waveguides; or
  iii. lower overall system cost; or
  iv. any combination of i, ii, and iii.

By virtue of the inclusion of the spotsize converter, these advantages are accrued while maintaining good optical coupling to external devices, such as optical fibers, laser, and/or detectors.

In some embodiments, the upper cladding layer in the high-contrast region is not thinned under the SI phase modulator.

An embodiment of the present invention is a planar lightwave circuit (PLC), the PLC including: (1) a high-contrast-waveguide region comprising a first waveguide portion that includes a multi-layer core that collectively supports propagation of a light signal having a first mode-field profile, the multi-layer core having; (a) a first layer comprising a first material, the first layer having a first thickness; (b) a second layer comprising the first material, the second layer having a second thickness that is greater than the first thickness; and (c) a third layer that is between the first layer and the second layer, the third layer comprising a second material, wherein the third layer has a third thickness that is less than or equal to 500 nm; (2) a low-contrast waveguide region comprising a second waveguide portion that includes a single-layer core that collectively supports propagation of a light signal having a second mode-field profile that is larger than the first mode-field profile, the single-layer core comprising the first layer; (3) a spotsize converter that optically couples the first waveguide portion and the second waveguide portion; and (4) a phase shifter disposed in the high-contrast-waveguide region, the phase shifter including the first waveguide portion, a first electrode layer, a second electrode layer, and a piezoelectric layer that is between the first electrode layer and the second electrode layer, wherein the phase shifter is operative for inducing stress in the first waveguide portion in response to a control signal.

BRIEF DESCRIPTION OF THE DRAWINGS

FIG. 1 depicts a functional block diagram of a PLC-based optical modulator in accordance with an illustrative embodiment of the present invention.

FIG. 2 depicts operations of a method suitable for forming a PLC in accordance with the illustrative embodiment.

FIGS. 6A-B depict schematic drawings of cross-sectional and top views, respectively, of a portion of a spotsize converter as disclosed in the parent application.

FIG. 11 depicts simulation results for the effective refractive index of HC waveguide 302 versus upper-electrode width, w2, for different lengths and thicknesses of piezo-electric layer 706 in accordance with the illustrative embodiment.

DETAILED DESCRIPTION

Figure 3:
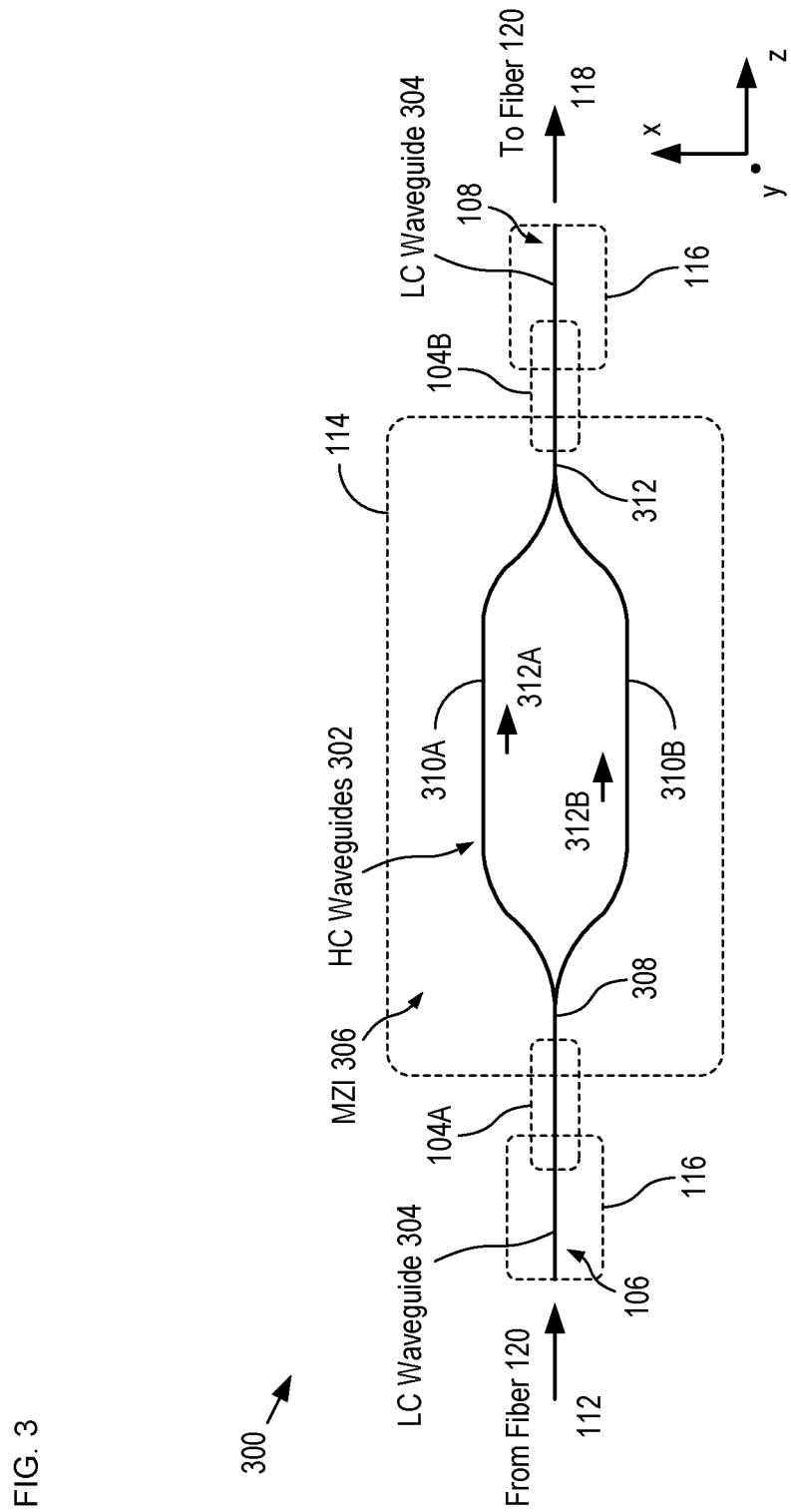
FIG. 3 depicts a schematic drawing of the surface waveguide network of modulator 100.

For the purposes of the present Specification, including the appended claims, the terms "Disposed on" or "Formed on" are defined as "exists on" an underlying material or layer either in direct physical contact or with one or more intervening layers. For example, if a material is described to be "disposed (or grown) on a substrate," this can mean that either (1) the material is in intimate contact with the substrate; or (2) the material is in contact with one or more layers that already reside on the substrate. It should be noted that a conformal layer is considered disposed on each surface of a structure to which it conforms.

This case is a continuation-in-part of U.S. patent application Ser. No. 14/051,715, entitled "Surface Waveguide Having a Tapered Region and Method of Forming" (hereinafter referred to as "the parent case"), which is incorporated in its entirety by reference. As discussed in the parent case, use of a waveguide-taper-based spotsize converters offers a way to improve optical coupling efficiency between a high-contrast waveguide (i.e., a surface waveguide whose core and cladding materials having a large difference in refractive index—typically 25-100%), and a conventional optical fiber by enabling control over the size of the mode-field profile at a waveguide facet so that it can more closely match that of an optical fiber.

Prior-art spotsize converters have several disadvantages, however. First, some only control the shape of an optical mode in one dimension, thereby providing only minimal improvement in optical coupling efficiency. Second, those that do offer control over the complete mode-profile shape are typically very difficult to controllably fabricate, making them difficult to commercialize. The parent case introduced a spotsize converter that overcomes some of the disadvantages of these prior-art spotsize converters.

The present invention combines the spotsize converter of the parent invention with an SI phase shifter formed in a high-contrast-waveguide region of a PLC substrate to realize a PLC having functional control over one or more optical signals and low optical coupling loss to external optical devices, where the chip real estate required for the PLC is significantly smaller than possible in the prior art.

FIG. 1 depicts a functional block diagram of a PLC-based optical modulator in accordance with an illustrative embodiment of the present invention. Modulator 100 includes switching element 102, spotsize converters 104, input port 106, and output port 108, all of which are monolithically integrated on substrate 110. Modulator 100 is operative for controlling the transmission of light from optical fiber 120A that is optically coupled with input port 106 to optical fiber 120B that is optically coupled with output port 108. In other words, modulator 100 receives light signal 112 and provides output signal 118. It should be noted that modulator 100 is merely an exemplary PLC-based optical system for which the present invention is applicable.

Modulator 100 is illustrative of the present invention in that it includes both high-contrast waveguide regions and low-contrast-waveguide regions, where at least one surface waveguide is common to both types of regions. The mode-field profile of a light signal propagating through this waveguide is adiabatically converted between that of each region via a spotsize converter. Further, functional control over the light signal is provided via a SI phase shifter formed within the high-contrast-waveguide region.

Still further, modulator 100 includes switching element 102, which comprises a network of high-contrast waveguides and a phase control element (i.e., SI phase shifter 122) that is operatively coupled with a portion of the waveguide network.

FIG. 2 depicts operations of a method suitable for forming a PLC in accordance with the illustrative embodiment. Method 200 begins with operation 201, wherein the surface waveguide network of modulator 100 is provided. Method 200 is described with continuing reference to FIG. 1, as well as reference to FIGS. 3-7.

FIG. 3 depicts a schematic drawing of the surface waveguide network of modulator 100. Network 300 includes high-contrast waveguides 302 (hereinafter referred to as HC waveguides 302) formed in high-contrast-waveguide region 114, low-contrast waveguides 304 (hereinafter referred to as LC waveguides 304) formed in low-contrast-waveguide region 116, and spotsize converters 104A and 104B, each of which includes a portion of an HC waveguide 302 and a portion of an LC waveguide 304 (i.e., each spotsize converter includes a portion of the LC and HC waveguide regions), as well as a transition region, the ends of which abut each of the LC and HC waveguide regions. In some embodiments, at least one of HC waveguide region 114 and LC waveguide region 116 includes several non-contiguous sub-regions that are interconnected via spotsize converters in similar fashion to that shown in FIG. 1.

Figure 4:
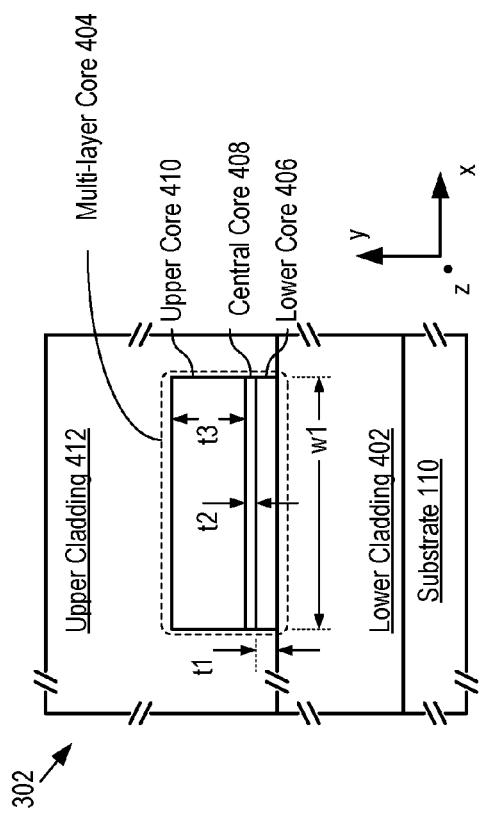
FIG. 4 depicts a schematic drawing of a cross-sectional view of an HC waveguide in accordance with the illustrative embodiment.

FIG. 4 depicts a schematic drawing of a cross-sectional view of an HC waveguide in accordance with the illustrative embodiment. Waveguide 302 includes lower cladding 402, multi-layer core 404, and upper cladding 412, all of which are disposed on substrate 110 as shown. Multi-layer core 404 comprises lower core 406, central core 408, and upper core 410, which collectively support the propagation of light signal 112 such that the optical mode of the signal is tightly confined. Methods suitable for forming an HC waveguide in accordance with the present invention are described in detail in the parent application.

Lower cladding layer 402 is a layer of silicon dioxide formed via conventional methods, such as thermal oxidation, low-pressure chemical-vapor deposition (LPCVD), plasma-enhanced chemical-vapor deposition (PECVD), spin-on techniques, sputtering, wafer bonding, etc. Lower cladding layer 402 has a thickness of approximately 8 microns. Typically, lower cladding layer 402 has a thickness within the range of approximately 2 microns to approximately 15 microns, although other thicknesses are within the scope of the present invention. In some embodiments, lower cladding layer 402 comprises one or more materials other than silicon dioxide, such as a different silicon oxide, or other dielectric. One skilled in the art will recognize that in order to perform as a cladding layer for waveguide 302, the refractive index of lower cladding layer 402 must be lower than the effective refractive index of cores 406 and 408, as described below. It will be clear to one skilled in the art how to specify, make, and use lower cladding layer 402. Further, in some embodiments, substrate 110 comprises a material, such as fused silica or another glass, which is suitable for use as a lower cladding for waveguide 302. In some of these embodiments, lower cladding layer 402 is not included and substrate 110, itself, acts as the lower cladding for waveguide 302.

The formation of multi-layer core 404 begins with the formation of lower core 406. Lower core 406 is a layer of LPCVD-deposited stoichiometric silicon nitride having a thickness, t1, of approximately 65 nanometers (nm). The thickness of lower core 406 is selected based on the desired mode-field profile for optical signal 112 in low-index region 120 or at the entry and exit facets of modulator 100. For example, a thickness of 65 nm is preferable for applications wherein the LC waveguide is intended to be mode-matched with a conventional optical fiber for light signals having wavelengths at or near 1550 nm. For visible-light applications, however, lower core 406 preferably is thinner, with a thickness within the range of approximately 25 nm to approximately 50 nm. Typically, lower core 406 has a thickness within the range of approximately 10 nm to approximately 100 nm, although other thicknesses are within the scope of the present invention.

Central core 408 is a layer of LPCVD-deposited, TEOS-based silicon dioxide formed in direct contact with lower core 406. Central core 408 has a thickness, t2, of approximately 100 nm. The thickness of central core 408 is selected to enable optical coupling of lower core 406 and upper core 410 such that these layers collectively support propagation of light signal 112, while also mitigating perturbation of the optical signal as it propagates through waveguide 302. Typically, central core 408 has a thickness, t2, within the range of approximately 10 nm to approximately 500 nm. It should be noted that, for visible-light applications, the thickness of central core 408 is preferably within the range of approximately 100 nm to approximately 200 nm. One skilled in the art will recognize, after reading this Specification, that the material used in central core 408 will depend upon the choice of materials for lower core 406 and upper core 410, as well as the wavelength of optical signal 112.

Upper core 410 is a layer of LPCVD-deposited stoichiometric silicon nitride formed in direct contact with central core 408. Upper core 410 has a thickness, t3, of approximately 300 nm. Typically, upper core 410 the value of t3 is within the range of approximately 100 nm to approximately 300 nm, although other thicknesses are within the scope of the present invention. For visible-light applications, the thickness of upper core 410 is typically thinner than for waveguides directed toward infrared applications. As a result, in visible-light applications, the thickness of upper core 410 is preferably within the range of approximately 100 nm to approximately 200 nm.

Upper cladding layer 412 is a layer of LPCVD-deposited TEOS-based silicon dioxide formed in direct contact with upper core 410. Upper cladding layer 412 has a thickness of approximately 8 microns. Typically, upper cladding layer 412 has a thickness within the range of approximately 2 microns to approximately 15 microns. In some embodiments, upper cladding layer 412 comprises a material other than LPCVD-deposited TEOS-based silicon dioxide. Materials suitable for use in upper cladding layer 412 include, without limitation, LPCVD-deposited silicon oxides, PECVD-deposited silicon oxides, spin-on glasses, other dielectrics, and the like.

One skilled in the art will recognize that the thicknesses and materials of core layers 406, 408, and 410 are a matter of design choice and is based on the wavelengths of light in light signal 112 and its desired mode-field profile. Materials suitable for use in core layers 406, 408, and 410 include any material that is substantially transparent for the wavelength of operation, such as stoichiometric silicon nitride, non-stoichiometric silicon nitride, silicon-rich silicon nitride, other dielectrics, doped glasses, semiconductors, silicon compounds (e.g., silicon carbide, silicon-germanium, etc.), compound semiconductors, and the like.

Figure 5:
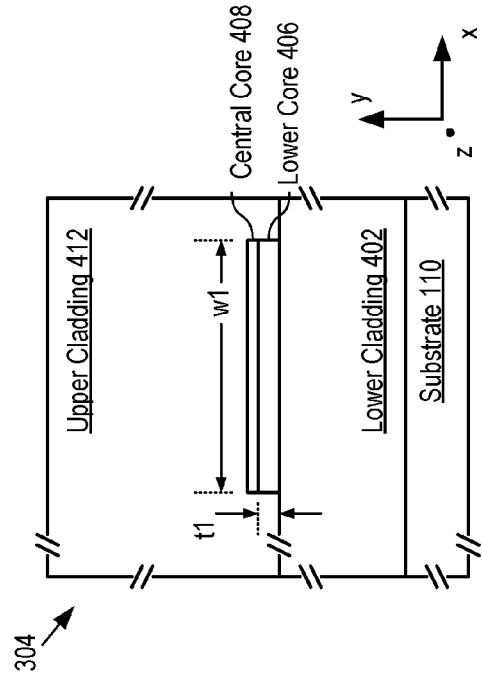
FIG. 5 depicts a schematic drawing of a cross-sectional view of an LC waveguide in accordance with the illustrative embodiment.

FIG. 5 depicts a schematic drawing of a cross-sectional view of an LC waveguide in accordance with the illustrative embodiment. Waveguide 304 includes lower cladding 402, lower core 406, central core 408, and upper cladding 412. In other words, the structure of LC waveguide 304 is that of HC waveguide 302 without the inclusion of upper core 410. It should be noted that central core 408 and upper cladding collectively define the upper cladding for LC waveguide 304. In some embodiments, central core 408 is not included in the waveguide structure of LC waveguide 304.

Lower core 406 is designed to support the propagation of light signal 112 such that the optical mode of the signal is substantially matched to that of optical fiber 120. As a result, LC waveguide 304 forms input ports 106 and 108, which enable low-loss optical coupling to optical fibers 120A and 120B. Methods suitable for forming an LC waveguide in accordance with the present invention are described in detail in the parent application.

In some embodiments, at least one of ports 106 and 108 include a mode-field converter (e.g., additional spotsize converter) that converts the mode-field profile of its respective light signal from that of LC waveguide 304 to one that matches an external optical element other than a conventional optical fiber, such as a light source (e.g., a laser, LED, VCSEL, etc.), a detector, a free-space lens system, and the like.

Returning now to FIG. 3, HC waveguide region 114 includes a plurality of HC waveguides that collectively define MZI 306. MZI 306 includes input waveguide 308, arms 310A and 310B, and output waveguide 312. Input waveguide 308, arms 310A and 310B, and output waveguide 312 are arranged such that, as light signal 112 propagates through input waveguide 308, it is split into equal parts 312A and 312B that propagate through equal length arms 310A and 310B, respectively, to output waveguide 312.

Input waveguide 308 is optically coupled with input port 106 via spotsize converter 104A. In similar fashion, output waveguide 312 is optically coupled with output port 108 via spotsize converter 104B. Each spotsize converter is designed such that it adiabatically converts the mode-field profile of its respective light signal between that of HC waveguide 302 and that of LC waveguide 304. The structure and fabrication of spotsize converter 104 are analogous to those of spotsize converters described in the parent case.

FIGS. 6A-B depict schematic drawings of cross-sectional and top views, respectively, of a portion of a spotsize converter as disclosed in the parent application. Spotsize converter 104B includes a portion of output waveguide 312, a portion of output port 108, and transition region 602. It should be noted that spotsize converter 104B is representative of spotsize converter 104A.

Transition region 602 comprises lower cladding 402, lower core 406, central core 408, vertical taper 604, and upper cladding layer 412. Transition region 602 enables a spotsize converter that controls the size and shape of the optical mode of output signal 118 as it passes between a high-contrast waveguide (i.e., output waveguide 312) and a low-contrast waveguide (i.e., output port 108). As discussed above, many spotsize converters of the prior art have only lateral tapers. The performance of such spotsize converters is limited because they control the size of the mode field primarily in only one dimension. Spotsize converter 104B includes both a lateral and vertical taper in transition region 602, however. Spotsize converter 104B, therefore, can enable control over the complete profile of the mode field and can yield spotsize converters with improved performance as compared to such prior-art spotsize converters.

Vertical taper 604 is a substantially linear taper whose thickness changes monotonically along length L1 from the as-deposited thickness of upper core 410 (i.e., t3) at point 606, where transition region 602 abuts high-contrast region 114, to zero (i.e., extinction) at point 608, where transition region 602 abuts low-contrast region 116. Vertical taper 604 forms angle θ1 with the x-z plane, as shown. The magnitude of θ1 is selected to facilitate adiabatic coupling of output signal 118 between output waveguide 312 and output port 108. Methods suitable for forming vertical taper 604 are described in U.S. Pat. No. 8,718,432, issued May 6, 2014, and entitled "Method for Forming a Spotsize Converter," which is incorporated herein in its entirety. In some embodiments, vertical taper 604 is formed via a different method suitable for forming a shaped vertical profile in a layer, such as shadow-mask etching, reactive ion-etching through a sacrificial, graded-thickness mask (e.g., formed using gray-scale lithography, etc.), wet etching, and the like. In some embodiments, vertical taper 604 has a non-linear taper, as described in U.S. patent application Ser. No. 14/270,014, filed May 5, 2014, and entitled "Layer Having a Non-linear Taper and Method of Fabrication," which is incorporated herein in its entirety.

HC waveguide 302 and LC waveguide 304 are defined such that each has a width, w1, that is equal to approximately 1 micron, which enables single-mode operation for each type of waveguide. For LC waveguide 304, this width facilitates good optical coupling with a conventional optical fiber. In some embodiments, one or both of HC waveguide 302 and LC waveguide 304 is designed with a different width. In such embodiments, a lateral taper is defined such that the width of lower core 402 and upper core 410 changes linearly along the length of transition region 602 (or, alternatively, within one of HC region 114 and LC region 116) to adiabatically change the width of the optical-mode profile of light signal 118 as it propagates between HC region 114 and LC region 116. For example, in some embodiments, LC region 116 is used as a long low-propagation-loss section in a PLC. In such embodiments, it can be desirable that the width of LC waveguide 304 be larger (e.g., 2-3 microns in width) to mitigate loss due to sidewall roughness while still maintaining single-mode behavior.

It should also be noted that, in some embodiments, during the lateral definition of HC waveguide 302 and LC waveguide 304, an angle is formed in the etch profile of the multi-layer core that results in the width of upper core 410 being smaller than the width of lower core 406.

Returning now to method 200, at operation 202, SI phase shifter 122 is formed in HC waveguide region 114 such that the phase shifter and MZI 306 collectively operate as switching element 102.

Figure 7A:
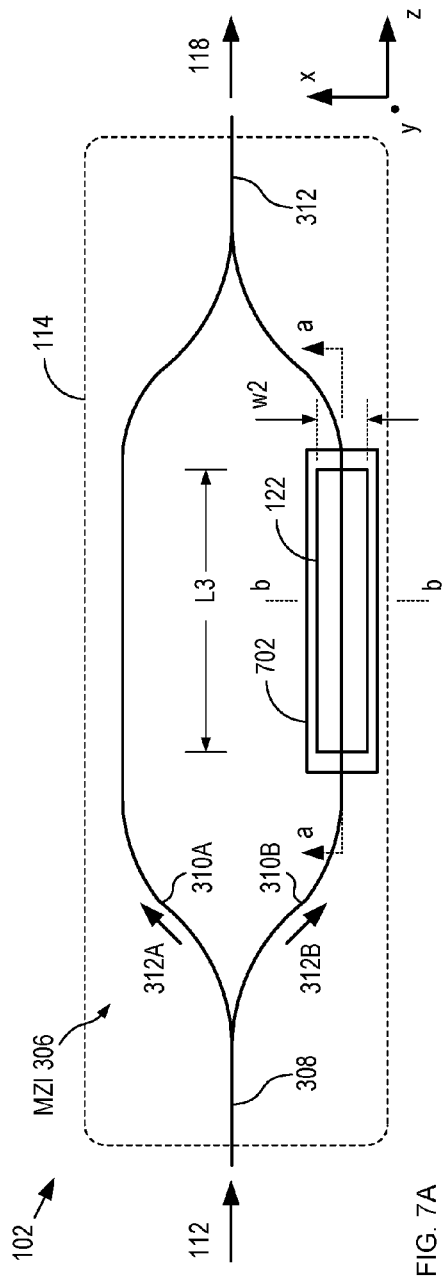
FIG. 7A depicts a schematic drawing of a top view of switching element 102. SI phase shifter 122 is operatively coupled with arm 310B of MZI 306.

FIG. 7A depicts a schematic drawing of a top view of switching element 102 in accordance with the illustrative embodiment of the present invention. Switching element 102 includes SI phase shifter 122, which is operatively coupled with HC waveguide 302 in arm 310B of MZI 306.

Figure 7B:
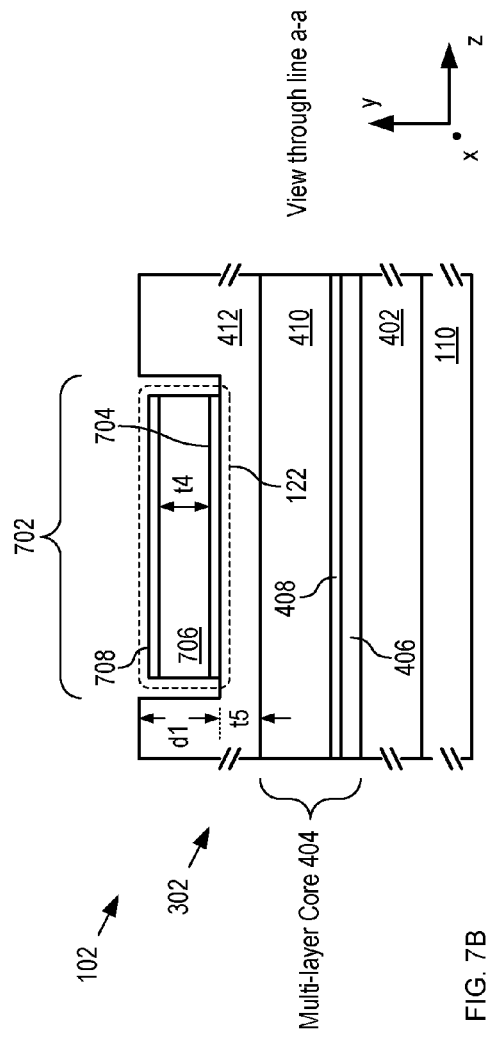
FIG. 7B depicts a schematic drawing of a cross-sectional view of SI phase shifter 122 and arm 310B.

FIG. 7B depicts a schematic drawing of a cross-sectional view of SI phase shifter 122 and arm 310B. The cross-section shown in FIG. 7B is taken through line a-a of FIG. 7A. SI phase shifter 122 is physically coupled with the waveguide layers of HC waveguide 302 in arm 310B so that strain generated in the phase shifter gives rise to stress in at least some of the layers of the waveguide. SI phase shifter 122 includes bottom electrode 704, piezoelectric layer 706, and top electrode 708.

Figure 8:
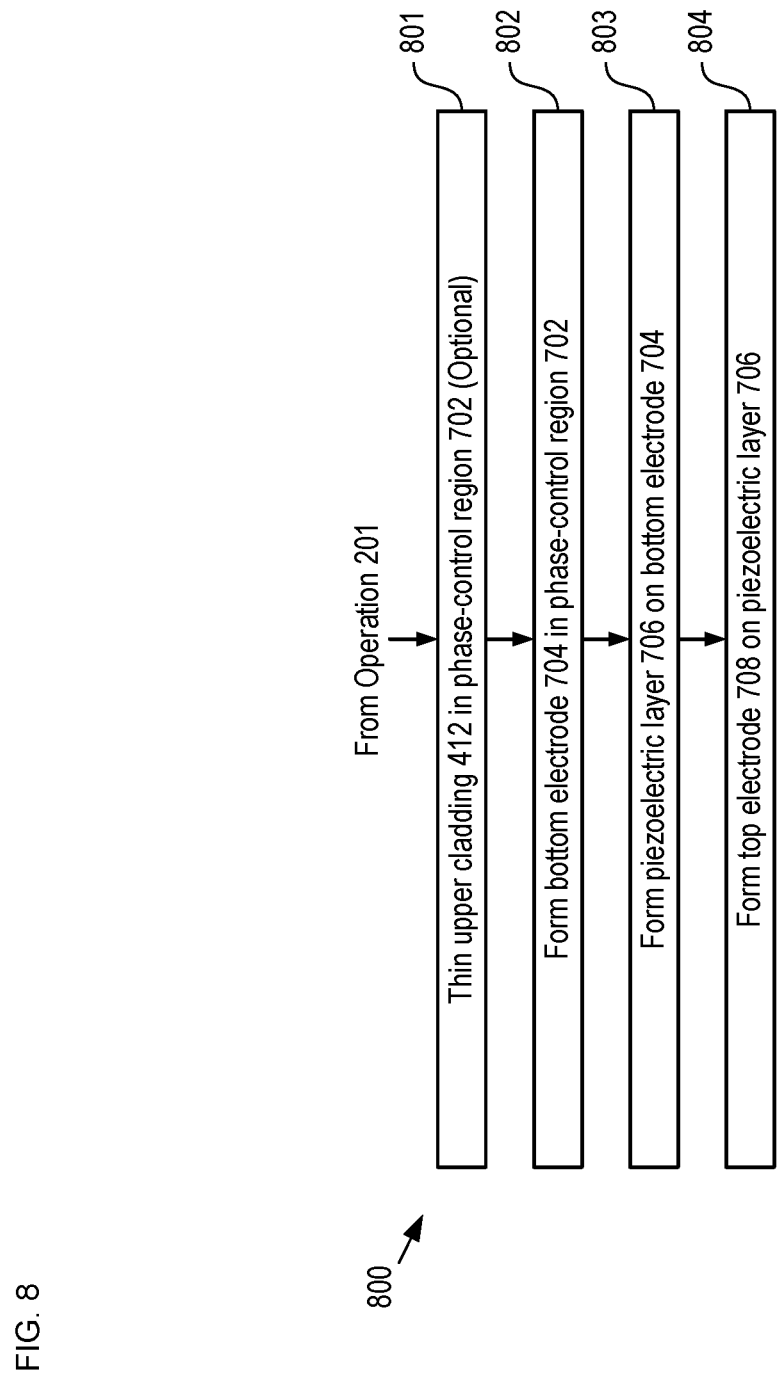
FIG. 8 depicts sub-operations of a method suitable for forming an SI phase shifter in accordance with the illustrative embodiment.

FIG. 8 depicts sub-operations of a method suitable for forming an SI phase shifter in accordance with the illustrative embodiment. Operation 202 begins with optional sub-operation 801, wherein upper cladding 412 is thinned by etching it to a depth of d1 in phase-control region 702 such that the upper cladding material under the phase shifter has thickness t5.

It is an aspect of the present invention that thinning upper cladding 412 in the region under SI phase shifter 122 enhances the mechanical coupling between piezoelectric layer 706 and the waveguide layers of arm 310B. This facilitates the efficient conversion of strain induced in piezoelectric material into stress in the underlying waveguide layers.

Figure 9:
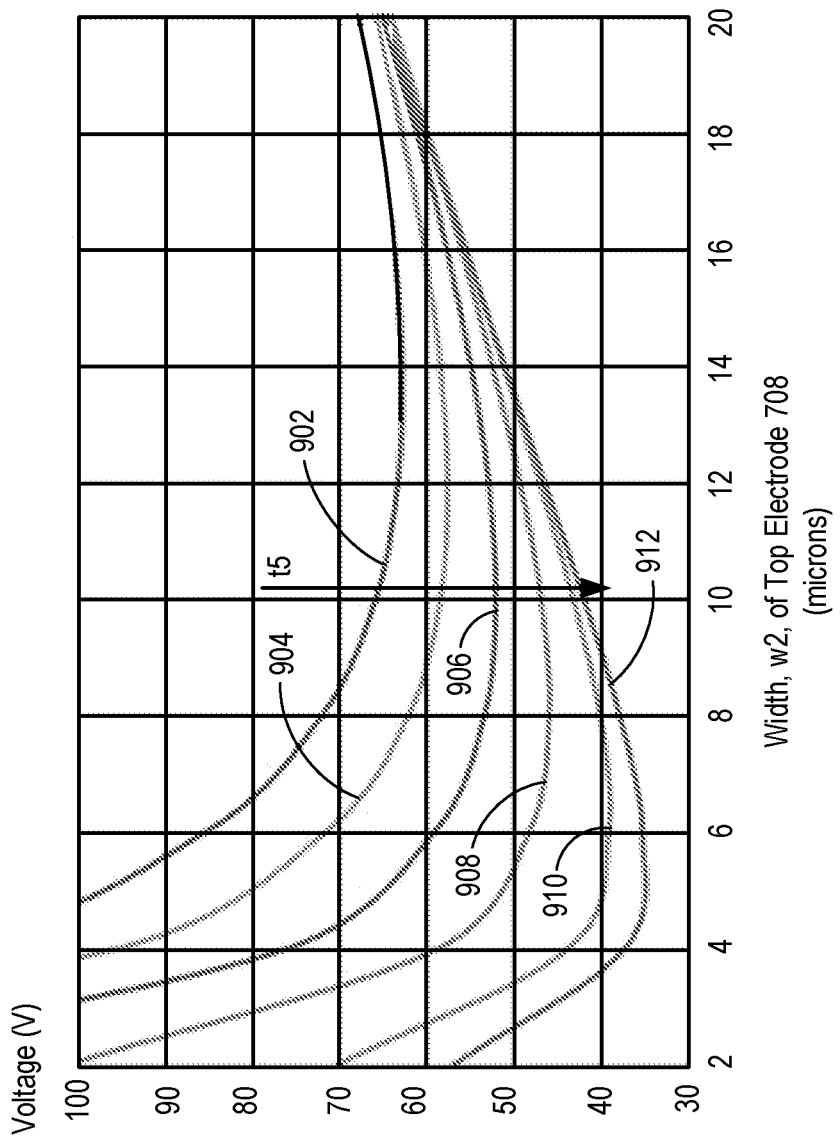
FIG. 9 depicts simulation results showing the voltage required to induce a 2π phase change in HC waveguide 302 versus upper-electrode width, w2, for different thicknesses, t5, of upper-cladding layer under phase shifter 122.

FIG. 9 depicts simulation results showing the voltage required to induce a $2\pi$ phase change in HC waveguide 302 versus upper-electrode width, w2, for different thicknesses, t5, of upper-cladding layer under phase shifter 122. Plot 900 shows the effectiveness of stress tuning in an HC waveguide 302 by an SI phase shifter in accordance with the present invention as the dimensions of the phase shifter are varied—specifically, the width of top electrode 708 and the thickness, t5, of upper cladding layer 412 under the SI phase shifter. The SI phase shifter is disposed on a dual-stripe waveguide having a width of 1.1 microns, where lower and upper cores have thicknesses of 65 nm and 175 nm, respectively.

Traces 902 through 912 correspond to structures having thicknesses t5 of 8, 7, 6, 5, 4, and 3.5 microns, respectively. Collectively, traces 902-912 clearly show the benefit of thinning upper cladding layer 412 under the SI phase shifter. The voltage required to induce a $2\pi$ phase shift for a cladding thickness, t5, of 3.5 microns is nearly half that required for an unthinned upper cladding layer (i.e., trace 902, where t5 is 8.0 microns). It should also be noted that the required width of top electrode 908 is reduced for thinner upper cladding layers as well.

At sub-operation 802, bottom electrode 704 is formed in phase-control region 702 such that it is in good physical contact with upper cladding 412. Bottom electrode 704 is a layer of electrically conductive material having a thickness of approximately 0.1 micron.

At sub-operation 803, piezoelectric layer 706 is formed on bottom electrode 704. Piezoelectric layer 706 is a layer of piezoelectric material having exemplary dimensions that include a thickness, t4, of approximately 2 microns, length, L3, of approximately 4.6 mm, and width, w2, of approximately 35 microns. It should be noted that piezoelectric layer 706 can have any suitable dimensions without departing from the scope of the present invention. Further, as discussed below and with respect to FIG. 10, the dimensions selected for piezoelectric layer 706 have significant impact on the effectiveness with which SI phase sifter 122 operates. Materials suitable for use in piezoelectric layer 706 include, without limitation lead-zirconate titanate (PZT), aluminum nitrate, quartz, polyvinylidene fluoride, and the like.

At sub-operation 804, top electrode 708 is formed on piezoelectric layer 706. Top electrode 708 is a layer of electrically conductive material having a thickness of approximately 0.1 micron. Materials suitable for use in each of bottom electrode 704 and top electrode 708 include, without limitation, metals (e.g., platinum, gold, tungsten, titanium-tungsten, etc.), silicides, semiconductors, conductive polymers, and the like. Furthermore, at least one of bottom electrode 704 and top electrode 708 can have a thickness other than 0.1 micron without departing from the scope of the present invention.

It should be noted that the length and width of piezoelectric layer, relative to the dimensions of HC waveguide 302, can significantly impact the effectiveness of SI phase shifter 122.

Figure 10A:
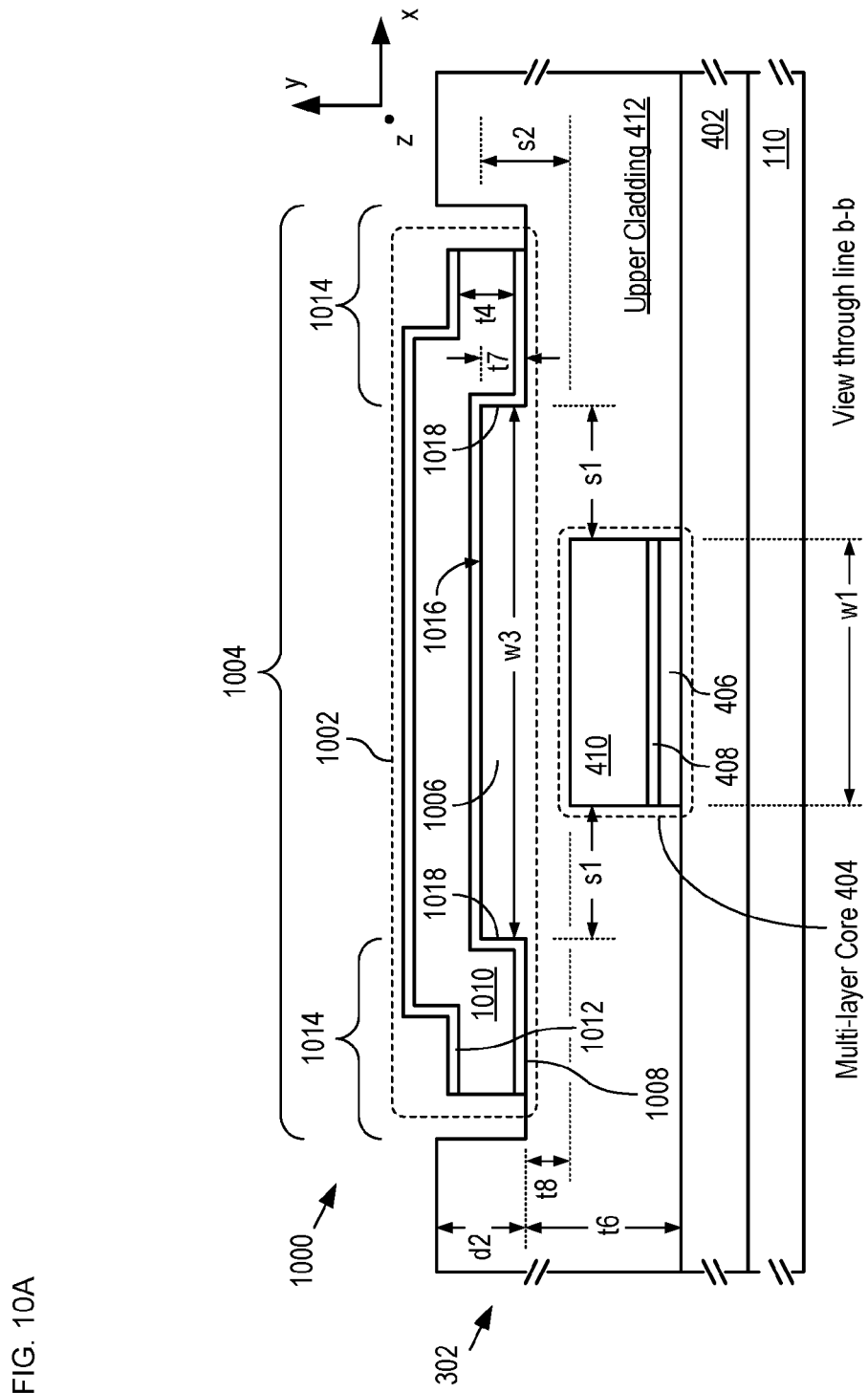
FIG. 10A depicts a schematic drawing of a cross-sectional view of a switching element in accordance with an alternative embodiment of the present invention.

FIG. 10A depicts a schematic drawing of a cross-sectional view of a switching element in accordance with an alternative embodiment of the present invention. The cross-section shown in FIG. 10 is taken through line b-b of FIG. 7A. Switching element 1000 includes SI phase shifter 1002, which is physically coupled with the waveguide layers of HC waveguide 302 in arm 310B so that strain generated in the phase shifter gives rise to stress in at least some of the layers of the waveguide. SI phase shifter 1002 includes bottom electrode 1008, piezoelectric layer 1010, and top electrode 1012, and is formed in phase-control region 1004. Phase control region 1004 is analogous to phase control region 702; however, phase control region 1004 includes projection 1006 and field regions 1014, which collectively define the topography of phase control region 1004. Projection 1006 includes top surface 1016 and sides 1018. The topography within phase control region 1004 facilitates the development of an enhanced stress configuration in the waveguide structure. Specifically, the topography of phase control region 1004 gives rise to a stress effect that arises at the edges of projection 1006.

Bottom electrode 1008, piezoelectric layer 1010, and top electrode 1012 are analogous to bottom electrode 704, piezoelectric layer 706, and top electrode 708, as described above and with respect to FIG. 7B. In the alternative embodiment, however, each of bottom electrode 1008, piezoelectric layer 1010, and top electrode 1012 has a shape that substantially conforms to the topography of phase control region 1004. As a result, each of these layers is disposed on each of top surface 1016 and sides 1018 of projection 1006. As the piezoelectric effect occurs in piezoelectric layer 1010, therefore, it gives rise to stress tensors that are laterally directed. This laterally directed stress can enhance the effect on the refractive indices of the layers of HC waveguide 302.

Exemplary dimensions for phase control region 1004 include a depth, d2, of approximately 5 microns, which results in a field thickness, t6, of approximately 3 microns for upper cladding 412 in field regions 1014, giving the thickness, t8, of upper cladding 412 between multi-layer core 404 and projection 1006 as approximately 2.5 microns. Projection 1006 projects above the field thickness by height, t7, which is approximately 3 microns and has width, w3, of approximately 10 microns. As a result, the separation, s1, between each edge of waveguide core 404 and the edge of projection 1006 is equal to approximately 4.5 microns (for HC waveguide 302 having width, w1, of 1 micron as discussed above and with respect to FIG. 4), and the separation, s2, between waveguide 302 and top surface 1016 is approximately 3 microns.

Generally, the dimensions of a phase control region in accordance with the present invention are based on the dimensions of the core layers of HC waveguide 300. In other words, the dimensions of phase control regions 702 and 1004 are typically designed relative to the width and thickness of each of lower core 406, central core 408, and upper core 410. Further, the separations, s1 and s2, between the structure of multi-layer core 302 and the features of projection 1006 (and, as a result, the topography of SI phase shifter 1002) are based on the wavelength of light signal 112. Typically, the values of s1 and s2 scale with wavelength (i.e., s1 and s2 are smaller for shorter wavelengths). Although the topography of phase control region 1004 can have any suitable dimensions without departing from the scope of the present invention, for a waveguide having core layers of widths within the range of 0.5 microns to 3 microns, the width, w3, of projection 1006 is typically within the range of approximately 0.5 microns to approximately 20 microns, field thickness, t6, is typically within the range of approximately 2 microns to 3 microns, and the height, t7, of projection 1006 is typically within the range of approximately 0.5 microns to approximately 6 microns. As a result, separation distances s1 and s2 are typically within the range of a few microns to approximately 10 microns.

It is an aspect of the present invention that the ratio of the width, w3, of projection 1006 to the thickness, t8, of upper cladding layer 1006 between core 404 and the projection can be controlled to control the distribution of lateral stress and vertical stress induced in the waveguide layers of HC waveguide 302. As a result, by controlling this ratio, the present invention enables a measure of control over the modal birefringence of the HC waveguide. This ratio is typically within the range of approximately 2.5:1 to approximately 6:1.

In a similar fashion, it is another aspect of the present invention that the ratio width, w3, of projection 1006 to the width, w1, of HC waveguide 302 can be controlled to affect the modal birefringence of the waveguide. The ratio of projection width, w3, to core width, w1, is typically within the range of 1:1 to 15:1.

In some embodiments, phase control region 1004 is formed by depositing the material of upper cladding 412 in conformal fashion, such that projection 1006 projects above the upper cladding in the field regions outside the region of multi-layer core 404 (i.e., field regions 1024).

Figure 10B:
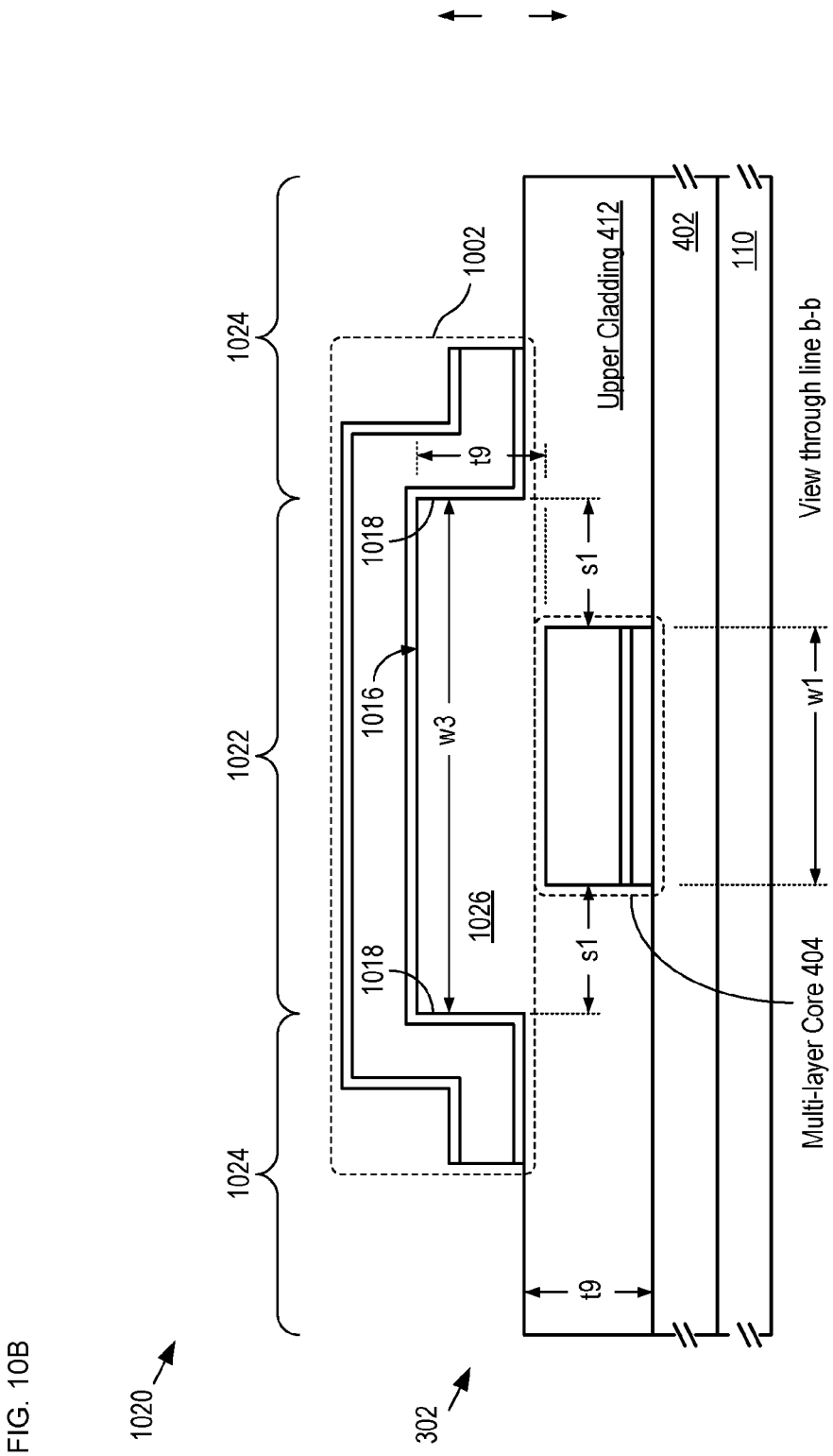
FIG. 10B depicts a schematic drawing of a cross-sectional view of a switching element in accordance with the alternative embodiment of the present invention, where phase control region is formed via conformal deposition of top-cladding-layer material over a multi-layer core.

FIG. 10B depicts a schematic drawing of a cross-sectional view of a switching element in accordance with the alternative embodiment of the present invention, where phase control region is formed via conformal deposition of top-cladding-layer material over a multi-layer core. Switching element 1024 includes SI phase shifter 1002, as described above.

During fabrication of switching element 1024, projection 1026 is formed by forming upper cladding 412 as a conformal layer over the topography of multi-layer core 404. As a result, phase control region 1022 has width w3 that is substantially equal to the width of multi-layer core 404 plus the thickness, t9, of upper cladding layer 412. In other words, the magnitude of s1 is approximately equal to that of t9 and multi-layer core 404 is surrounded by a substantially uniform thickness layer of upper cladding material. As discussed above, the topography of phase control region 1022 gives rise to a stress effect that arises at the edges of projection 1026.

Generally, the value of t9 is within the range of approximately 2 microns to approximately 15 microns. Typically, however, t9 is within the range of approximately 2 microns to 7 microns, and is preferably within the range of approximately 3 microns to 4 microns. As a result, the ratio of w3 to w1 is within the range of approximately 5:1 to approximately 30:1 and typically within the range of approximately 5:1 to approximately 15:1. Preferably, however, the ratio of w3 to w1 is within the range of approximately 7:1 to approximately 9:1.

Returning now to the illustrative embodiment, FIG. 11 depicts simulation results for the effective refractive index of HC waveguide 302 versus upper-electrode width, w2, for different lengths and thicknesses of piezoelectric layer 706. Plot 1100 shows the effect of changes in the dimensions of piezoelectric layer 706 on the effectiveness with which SI phase shifter 122 changes the effective refractive index of waveguide 302 for TM polarized light at a constant applied electric field. Plot 1102 shows the effect of changes in the dimensions of piezoelectric layer 706 on the effectiveness of SI phase shifter 122 changes the effective refractive index of waveguide 302 for TE polarized light at a constant applied electric field.

Figure 12:
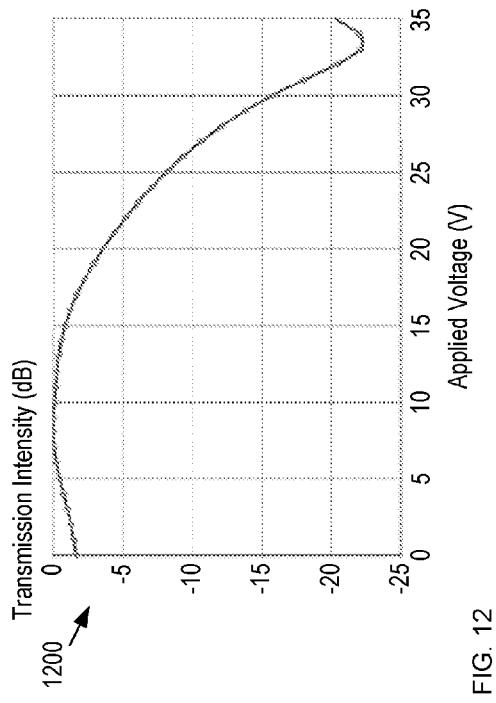
FIG. 12 depicts a plot of measured modulation depth induced in HC waveguide 302 by phase shifter 122.

FIG. 12 depicts a plot of measured modulation depth induced in HC waveguide 302 by phase shifter 122. Plot 1200 shows the transmission intensity of output signal 118 versus applied voltage over the range from 0 V to 35 V.

Plot 1200 shows that π phase modulation can be attained at a reasonable applied voltage, which corresponds to a power consumption of approximately 3 microWatts. For comparison, it is noted that a prior-art TO phase shifter would require approximately 500 milliWatts (i.e., more than one hundred thousand times the power) to achieve 2π phase modulation.

Figure 13:
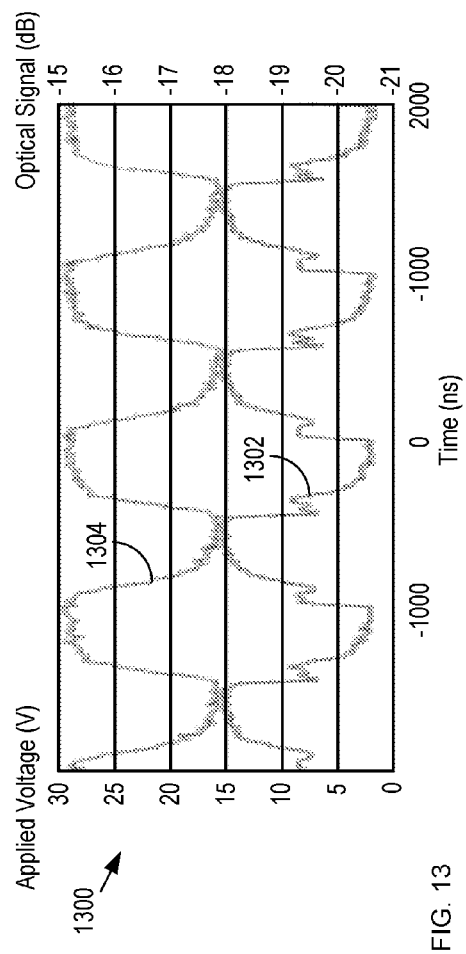
FIG. 13 depicts a plot of measured switching speed in HC waveguide 302 by phase shifter 122.

FIG. 13 depicts a plot of measured switching speed in HC waveguide 302 by phase shifter 122. Plot 1300 includes trace 1302 and 1304. Trace 1302 shows the applied drive signal, while trace 1304 corresponds to output signal 118.

Plot 1300 demonstrates a switching speed of approximately 150 ns obtained with the SI phase shifter. It is believed that faster switching speeds are attainable with different configurations in accordance with the present invention. By comparison, a prior art TO phase shifter would require approximately 100 microseconds to switch output signal 118 (approximately six orders of magnitude slower).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A planar-lightwave circuit (PLC) comprising:
    a first waveguide having:
        a core that supports the propagation of an optical mode of a first light signal, the optical mode including a first TE-polarization mode and a first TM-polarization mode, the core including a plurality of layers that collectively support the propagation of the optical mode, the plurality of layers comprising a first silicon nitride layer, a second silicon nitride layer, and a silicon dioxide layer that is between the first silicon nitride layer and second silicon nitride layer; and
        a top cladding disposed on the core;
    a first layer comprising a piezoelectric material, the first layer being disposed on the first waveguide in at least a portion of a first region;
    wherein the first layer is dimensioned and arranged to induce a first stress-induced phase shift in the first TE-polarization mode and a second stress-induced phase shift in the first TM-polarization mode in response to a first electric signal applied to the first layer.

2. The PLC of claim 1 wherein the first layer is operative for inducing at least one of the first phase shift and second phase shift such that it is a π phase shift when the first electric signal is characterized by a power level that is less than or equal to 5 microWatts.

3. The PLC of claim 1 further comprising a projection in the first region, the projection being a portion of the top cladding and having a top surface, a first side, and a second side; wherein the first layer is disposed on the top surface and each of the first and second sides.

4. The PLC of claim 3 wherein the projection is characterized by a first ratio of width to height, and wherein a second ratio of the first phase shift to the second phase shift is based on the first ratio.

5. The PLC of claim 1 wherein the first layer is characterized by a first ratio of thickness to length, and wherein a second ratio of the first phase shift to the second phase shift is based on the first ratio.

6. The PLC of claim 3 wherein a first ratio of the first phase shift to the second phase shift is based on a second ratio of a first width of the projection and a second width of the core.

7. The PLC of claim 1 further comprising:
a second waveguide, the second waveguide being operative for supporting propagation of a second light signal that includes a second TE-polarization mode and a second TM-polarization mode;
a third waveguide; and
a coupler operative for (1) combining the first light signal and second light signal into a third light signal having a third TE-polarization mode and a third TM-polarization mode and (2) coupling the third light signal into the third waveguide;
wherein the magnitude of each of the third TE-polarization mode and third TM-polarization mode is based on the magnitude of the first electrical signal.

8. A planar-lightwave circuit (PLC) comprising:
a first waveguide having a core and a top cladding disposed on the core, wherein the first waveguide has a first region in which the core includes a plurality of layers that collectively support the propagation of a first light signal having a first optical mode that includes a first TE-polarization mode and a first TM-polarization mode, the plurality of layers including a first silicon nitride layer, a second silicon nitride layer, and a silicon dioxide layer that is between the first and second silicon nitride layers; and
a stress-inducing (SI) phase shifter that is operatively coupled with the first waveguide in the first region;
wherein the SI phase shifter is dimensioned and arranged to induce a stress in at least one layer of the plurality thereof to control a first phase shift in the first TE-polarization mode and a second phase shift in the first TM-polarization mode.

9. The PLC of claim 8 wherein the first waveguide includes a projection in the first region, the projection including a top surface, a first side, and a second side, and wherein the SI phase shifter includes a first layer of piezoelectric material that is disposed on each of the top surface, the first side, and the second side.

10. The PLC of claim 8 further comprising:
a second waveguide;
a third waveguide; and
a coupler that is operative for combining the first light signal and a second light signal propagating in the second waveguide into a third light signal and optically coupling the third light signal into the third waveguide;
wherein the second light signal has a second optical mode that includes a second TE-polarization mode and a second TM-polarization mode; and
wherein the third light signal has a third optical mode that includes a third TE-polarization mode whose magnitude is based on the stress and a third TM-polarization mode whose magnitude is based on the stress.

11. The PLC of claim 8 wherein the first waveguide includes a second region in which the first silicon nitride layer has a thickness that changes from a first thickness to zero, and wherein the first region and second region are optically coupled.

12. The PLC of claim 8 wherein the first waveguide includes a projection in the first region, and wherein the SI phase shifter is disposed on at least a portion of the projection, and further wherein the projection and the core are dimensioned and arranged such that the first and second phase shifts are substantially equal.

13. A method for controlling the phase of each of a TE-polarization mode and a TM-polarization mode of a light signal propagating through a first waveguide of a planar-lightwave circuit (PLC), the method comprising:
providing the first waveguide such that, in a first region, it includes a core that comprises a plurality of dielectric layers that includes a first silicon nitride layer, a second silicon nitride layer, and a silicon dioxide layer that is between the first and second silicon nitride layers, the plurality of dielectric layers collectively supporting an optical mode of the light signal, the optical mode including the TE-polarization mode and TM-polarization mode;
providing a first layer comprising a piezoelectric material, the first layer being disposed on the first waveguide;
applying a first electric signal to the first layer; and
controlling the magnitude of the first electrical signal;
wherein the application of the first electric signal to the first layer gives rise to a stress in the first waveguide; and
wherein the first layer is dimensioned and arranged such that the stress induces a first stress-induced phase shift in the TE-polarization mode and a second stress-induced phase shift in the TM-polarization mode.

14. The method of claim 13 wherein the magnitude of first electric signal is controlled to induce a π phase shift on at least one of the TE-polarization mode and the TM-polarization mode at a power consumption level that is less than or equal to 5 microWatts.

15. The method of claim 13 further comprising controlling the first phase shift and second phase shift such that they are substantially equal.

16. The method of claim 13 further comprising forming the first waveguide such that it includes a second region in which the core comprises the first silicon nitride layer, the second silicon nitride layer, and the silicon dioxide layer, wherein the thickness of the first silicon nitride layer changes monotonically from a first thickness to zero in the second region.

17. The method of claim 13 further comprising providing the waveguide such that it includes an upper cladding layer between the core and the first layer, wherein the core has a width and the upper cladding layer has a thickness, and wherein at least one of the first phase shift and second phase shift is based on a ratio between the width and thickness, and wherein the ratio is within the range of approximately 2.5:1 to approximately 6:1.

* * * * *